United States Patent
Ventrice

(10) Patent No.: US 10,519,634 B2
(45) Date of Patent: Dec. 31, 2019

(54) CURB BOX AND METHOD

(71) Applicant: FLEXTEXX INC., Toronto (CA)

(72) Inventor: Domenic Ventrice, Maple (CA)

(73) Assignee: FLEXTEXX INC., Toronto (CA)

( * ) Notice: Subject to any disclaimer, the term of this patent is extended or adjusted under 35 U.S.C. 154(b) by 0 days.

(21) Appl. No.: 15/948,606

(22) Filed: Apr. 9, 2018

(65) Prior Publication Data

US 2018/0298594 A1  Oct. 18, 2018

Related U.S. Application Data

(60) Provisional application No. 62/486,723, filed on Apr. 18, 2017.

(51) Int. Cl.
 *E03B 9/08* (2006.01)
 *F16K 27/00* (2006.01)

(52) U.S. Cl.
 CPC ............. *E03B 9/08* (2013.01); *F16K 27/006* (2013.01); *Y10T 137/7017* (2015.04)

(58) Field of Classification Search
 CPC ..... E03B 9/08; E03B 9/10; E03B 9/12; E03B 9/20; F16L 27/12; F16L 27/125; F16K 27/006; Y10T 137/7017
 USPC ................... 137/363–372, 294–296
 See application file for complete search history.

(56) References Cited

U.S. PATENT DOCUMENTS

| | | | | |
|---|---|---|---|---|
| 1,360,559 A * | 11/1920 | Monahan | ................... | B60S 5/04 137/355.24 |
| 2,033,880 A | 3/1936 | Coles et al. | | |
| 2,931,383 A * | 4/1960 | Handley | ............. | F16K 31/5284 137/369 |
| 3,548,864 A | 12/1970 | Handley et al. | | |
| 3,746,034 A | 7/1973 | Cosson | | |
| 4,133,347 A * | 1/1979 | Mercer | ................... | B60R 15/00 137/240 |
| 4,290,443 A * | 9/1981 | Crozzoli | ................. | F04F 10/00 137/147 |
| 4,308,886 A | 1/1982 | Handley et al. | | |
| 4,325,405 A * | 4/1982 | Christo | ............... | E02D 29/1409 137/370 |
| 5,324,001 A * | 6/1994 | Duke | ...................... | B60R 15/00 251/147 |
| 5,372,453 A * | 12/1994 | Argandona | .......... | B65D 90/105 137/371 |
| 6,484,748 B1 * | 11/2002 | Baker | ....................... | E03B 9/20 137/363 |
| 2002/0066876 A1 * | 6/2002 | Carpenter | ............... | F16L 27/12 251/148 |

(Continued)

*Primary Examiner* — Kevin F Murphy
*Assistant Examiner* — Jonathan J Waddy
(74) *Attorney, Agent, or Firm* — Bennett Jones LLP

(57) ABSTRACT

A curb box for underground gas and water services includes a tubular member such as a pipe that extends from a valve in an underground line up to surface. A resiliently flexible tubular member segment is installed in the tubular member between an uppermost end of the tubular member and a lower portion of the tubular member. The resiliently flexible tubular member segment allows the uppermost end to resiliently flex relative to the lower portion. As such, if impacted, the uppermost end can resiliently yield at the resiliently flexible tubular member, thereby preventing the tubular member from being bent and rendered inoperable as a conduit to the valve in the underground line.

17 Claims, 5 Drawing Sheets

(56) References Cited

U.S. PATENT DOCUMENTS

2007/0208300 A1\* 9/2007 Pravong ............... A61M 1/008
  604/96.01

\* cited by examiner

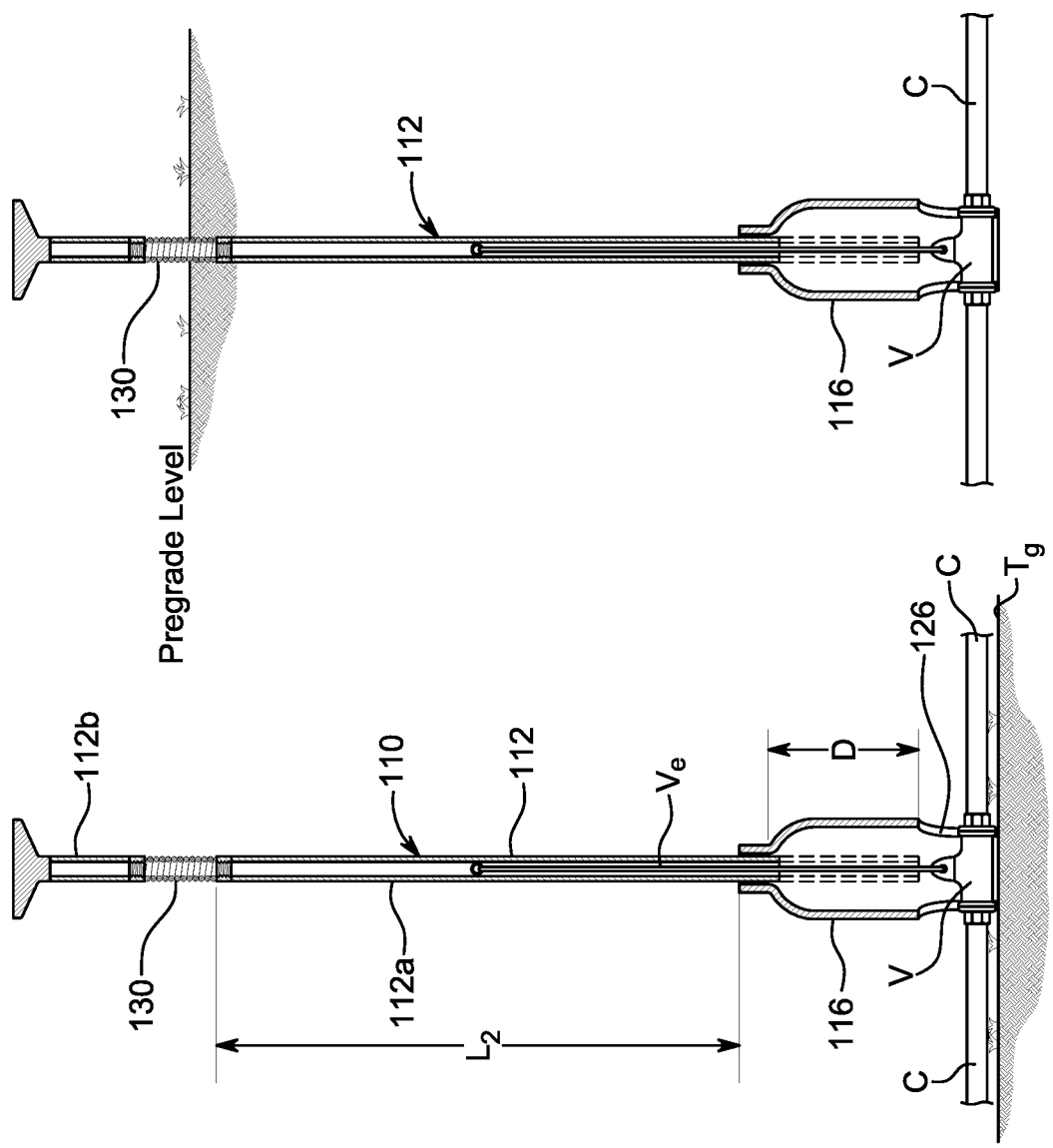

CURB BOX AND METHOD

FIELD

The invention relates to a curb box and in particular a curb box with improved durability and utility and also methods for using the curb box.

BACKGROUND

Curb boxes are employed widely to facilitate access to buried utility service valves and lines such as are customarily part of gas and water distribution systems. Generally, a curb box includes a housing at one end and a stem extending from the housing. The housing is configured so that it can overlie and cover a buried utility valve. The housing is buried during installation of the curb box and the housing protects and forms a space between the valve and the housing which is free of fill and permits access to the valve. The stem is generally an elongated tubular member fabricated of a single piece of tubing, which provides the vertical passage through which the valve, within the curb box, can be accessed. For example, an elongated key can be inserted down through the vertical passage to contact the valve or an extension therefrom within the housing or within the stem. The elongated tubular member is also partially or totally buried during installation of the curb box. Ultimately, following completion of construction and final grading of the property, only an opening at the upper end of the tubular member is exposed at ground surface. A cap may be installed on the upper end of the stem.

When installing a curb box, an open trench is dug in the ground in which the utility service distribution piping and associated valve are laid. The curb box housing, with the stem extending upwardly therefrom, is placed over the valve, and the trench is back filled, generally to the then prevailing "grade level" often referred to as the "pre-grade". The housing is entirely buried by the back fill. A lower portion of the stem is buried to pre-grade level but an upper portion is customarily allowed to protrude above pre-grade level so as to serve as a marker for the location of the valve and to permit access from above ground to open and close the valve below ground. The upper portion of the stem remains exposed above grade level until completion of construction when final grading including addition of top soil and turf is completed thereby bringing the fill around the curb box up to final ground surface, what is called the "final grade". At that point, either the final grade is adjusted so the curb box stem and cap are covered until only the upper surface of the curb box cap remains exposed or the length of the curb box stem is adjusted so the top of the cap on the stem is level with the final grade.

During construction prior to final grading, however, the upper portion of the curb box stem that protrudes above pre-grade level is susceptible to damage by any lateral application of force. In particular, after back filling and prior to final grading, the protruding, upper portion of the elongated tubular member is generally exposed to construction traffic including, but not limited to cars, pick-up and delivery trucks as well as heavy construction vehicles such as cement trucks, fork lifts, front end loaders, bob cats, blades, etc. When exposed to this type of traffic, the curb box may be impacted by lateral forces that damage the stem. This damage may bend the tubular member irreversibly, thereby pinching off the vertical passage and preventing access to the valve contained in the housing at the bottom of the curb box.

SUMMARY

In accordance with a broad aspect of the present invention, there is provided a curb box comprising: a hollow housing configured to overlie a valve of a utility service; and a stem coupled to the housing and extending upwardly from the housing, the stem including two or more tubular segments joined end-to-end, at least one of the tubular segments being laterally, resiliently bendable.

In accordance with another broad aspect of the present invention, there is provided a method for accessing a buried valve, the method comprising: installing a housing of a curb box about a valve and with a stem of the curb box extending substantially vertically upwardly from the housing; adding fill about the curb box to bury the housing and a lower portion of the stem, while leaving a laterally resilient portion of the stem at least partially protruding above a grade level of the fill; leaving the laterally resilient portion in a substantially vertical protruding position above the grade level, the laterally resilient portion being configured to withstand lateral applications of force with the ability to resiliently recover to the substantially vertical protruding position; and accessing the valve within the curb box by inserting a straight tool through a passageway within the stem, which is open and substantially straight.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIGS. 4A to 4F are schematic illustrations of method steps in accord with the invention.

DESCRIPTION OF VARIOUS EMBODIMENTS

Figure 3:
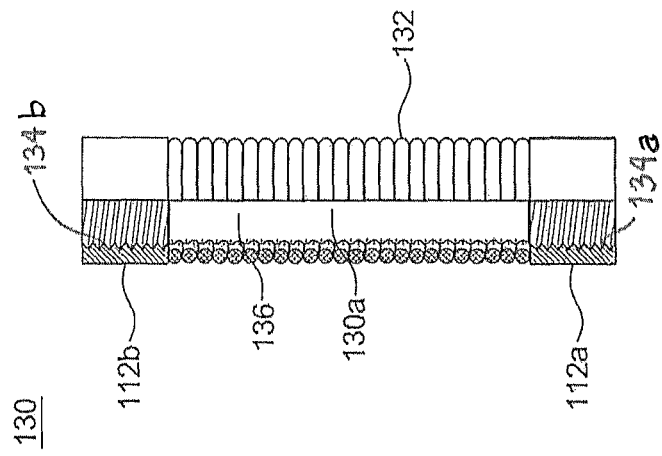
FIG. 3 is an enlarged view of a laterally resilient joint useful in curb box in accord with the invention.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A curb box 10 includes a stem, which is an elongate tubular member 12. A cap 14 may be installed on an upper end 12c of the stem. The lower end of curb box 10 is defined by the hollow, bell-shaped curb box housing 16 which encompasses the valve V of the utility service to which access may be desired.

The housing 16 is of a generally cylindrical, oblong or rectangular configuration including side walls 18 and a top 20. The side walls 18 extend to the lower end of the housing terminating at a lower edge 22, wherein generally the lower end of the bell housing is open. The top 20 of the housing spans the side walls and completes the enclosure of the housing.

The side walls 18 may include at least one and generally at least two archway type openings 26 for accommodating the utility service distribution piping C (i.e. piping conduits such as lines, pipes, tubing, etc.) extending from the valve of the utility service. For example, there may be arched openings 26 in opposite side walls extending up from the housing lower edge 22.

Thus, it will be appreciated that the hollow housing 16 is sized to fit over the valve and an arched opening 26 is defined in each of the side walls where a utility service distribution conduit extends from the valve and each arched opening has a dimension larger than the diameter of the conduit line over which the arched opening is to be placed.

Figure 2:
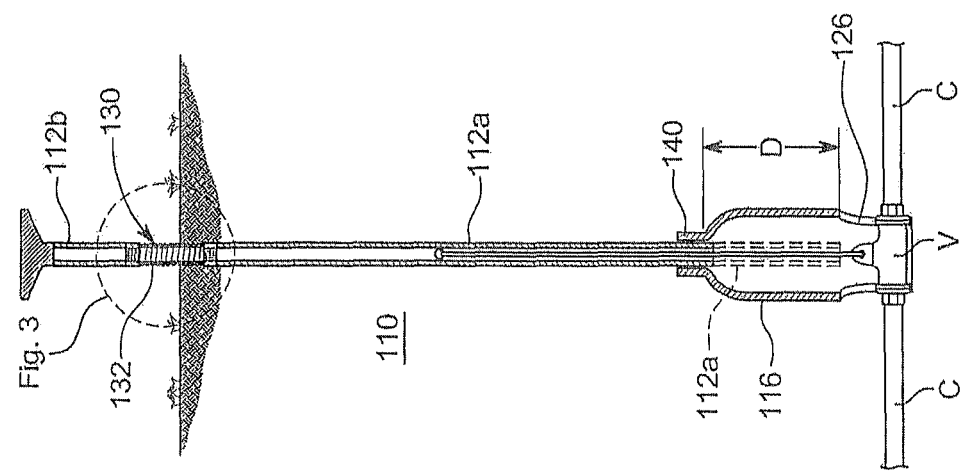
FIG. 2 is a sectional view through another curb box in accord with the invention, the curb box being shown buried to grade level. See line I-I in FIG. 1 for a reference to the sectional orientation.
Figure 1:
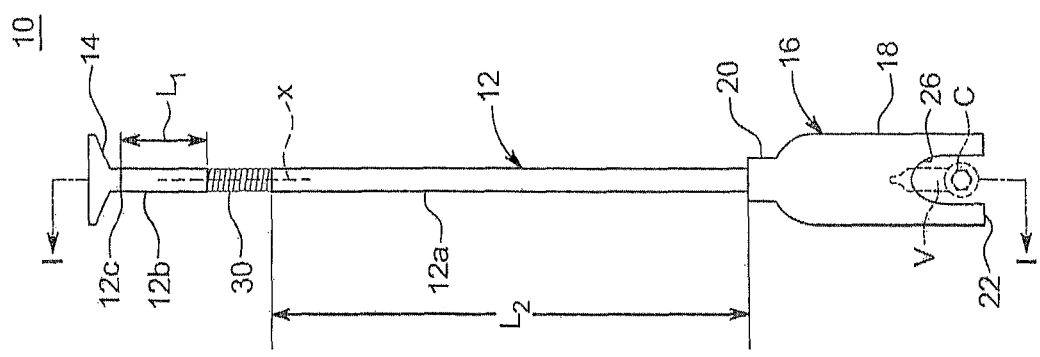
FIG. 1 is an elevation view of a curb box in accord with the invention, the valve being shown within the curb box in dotted lines.

The stem, which is elongate tubular member 12, is coupled to the top 20 of the housing. The coupling may be an integral connection or a joint connection. In FIG. 1, there is an integral connection between member 12 and top 20. In FIG. 2, the curb box 110 has a joint connection 140 between the lower end of stem 112 and housing 114. The joint connection 140 also is configured for stem length adjustment. In particular, depth D of the stem within housing is variable, as shown in phantom lines. Joint connection 140 may be telescopically moveable and may avoid transmission of axial pressure through the curb box into the utility distribution service line and associated valve and may permit adjustment of the length of the stem during grading.

The elongate tubular member 12 includes two or more tubular segments joined end-to-end, at least one of the tubular segments being laterally, resiliently bendable. For example, member 12 includes a laterally resilient tubular segment, shown as a laterally resilient joint 30. The laterally resilient segment may be at or near the stem's upper end 12c. In one embodiment, joint 30 may extend fully to the upper end of the stem, for example, elongate tubular member 12 may include a lower end 12a and joint 30 thereabove, which extends and defines upper opening at the upper end of the member onto which cap 14 is secured. While joint 30 may extend to the top of the stem, it may be beneficial to include a non-flexible upper member above joint 30. As such, in another embodiment, elongate tubular member 12 includes lower end 12a, an upper tubular segment 12b and laterally resilient joint 30 installed between the lower end and the upper tubular segment and, thereby, connecting the lower end and the upper end. Each of the lower end 12a, upper tubular segment 12b and resilient joint 30 are hollow and tubular in construction such that a passage way is formed through the upper opening 12c in upper tubular segment 12b, through upper tubular segment 12b, joint 30 and lower end 12a to housing 16.

Lower end 12a and upper segment 12b are straight, substantially rigid tubes such as of metal, for example, steel or cast iron or other metallic or non-metallic materials. Tubular segments 12a, 12b are therefore durable, but are plastically deformable if impacted by sufficient lateral loads. Lower end 12a and upper tubular segment 12b, therefore, are straight from end to end along their axis and have sufficient rigidity to retain their straight configuration unless impacted by lateral loads sufficient to plastically deform or shear them.

Laterally resilient joint 30 is a straight, cylindrically-shaped, tubular structure which is laterally resilient in all directions, which means joint 30 is omni-directionally, elastically deformable relative to its long axis x. Joint 30 is, in other words, self-straightening when bent and, when axis x is vertically oriented, joint 30 is self-righting when bent sideways and down. Joint 30 may also in some embodiments be resiliently extensible and/or resiliently compressible.

Being substantially cylindrical, joint 30 bends in all directions, 360° relative to axis x, in a substantially uniform and consistent manner.

Joint 30 is positioned along the stem closer to the upper opening 12c than to housing 16. In particular, upper tubular segment 12b has a length L1 between opening 12c and joint 30 and lower end 12a has a length L2 between housing 16 and joint 30 and the length L1 is shorter than the length L2 of lower end 12a.

Joint 30 is configured to hold the stem substantially straight when in a neutral position (i.e. with no lateral forces applied). In other words, joint 30 normally, when not subject to an applied bending force, is straight along its axis x and holds the weight of upper tubular segment 12b substantially without bending and, in particular, holds upper tubular segment 12b in substantial axial alignment with lower end 12a.

In the embodiment of FIG. 1, laterally resilient joint 30 is an elastically deformable tube securely connected at one end to lower end 12a of the stem and securely connected at its opposite end to upper tubular segment 12b. The elastically deformable tube has an internal passage along its full length such that the inner diameter of upper member 12b, the internal passage and the inner diameter of lower member 12a together form the vertical passage from upper opening 12c to the inner hollow cavity within housing 16.

While FIG. 1 shows one embodiment of a joint 30 according to the invention, the laterally resilient joint can take various forms such as substantially cylindrical bellows, articulated tube, ball joint, biased joint or spring. For example, FIGS. 2 and 3 illustrate another embodiment of curb box, where the stem's laterally resilient joint 130 includes a spring 132.

Joint 130 includes spring 132, which is tubular, for example, in the form of a coil spring. While spring 132 can be connected in various ways between the rigid tubulars of lower end 112a and upper end 112b, in this illustrated embodiment joint 130 includes spring 132 with its ends connected, as by welding, to threaded couplings 134a, 134b. Joint 130 can also be attached directly by threaded couplings to lower end 112a and upper end 112b. The spring 132 and couplings 134a, 134b all are tubular such that an internal passage 130a extends fully from end to end of the coupling.

The coils of spring 132 may be oriented close together with each turn laying tight against the next, to form a generally solid tubular wall when in the neutral position. However, if desired, a shield 136 may be positioned in or over the spring. Shield 136 may be positioned to block debris from passing through the coils of the spring and entering the internal passage within the spring. The shield may be a sleeve that extends over or, as shown, within the internal passage of the spring coil. Shield 136 is flexible and configured to flex with the spring.

In use, a curb box such as one shown in FIG. 1 or FIG. 2 is installed with its housing about a valve and the stem extending substantially vertically upwardly from the housing. Fill is then added about the curb box to bury the housing and a lower portion of the stem, leaving at least a portion and often all of the laterally resilient joint protruding above pre-grade level. The laterally resilient joint can remain protruding above grade level and can withstand lateral applications of force with the ability to resiliently recover to its substantially vertical position. For example, before or after a lateral force has been applied to the stem, the valve within the curb box can be accessed by inserting a tool through the vertical passageway within the stem, which is open and substantially straight.

A method for using a curb box is shown with reference to FIGS. 4A-4F. During property development construction, utility services including conduit lines C and valves V are placed along the bottom Tg of trenches T (FIG. 4A) and the trench is filled to a pre-grade level to bury the utility services. The depth at which the utility line is buried depends on the type of line and local requirements, usually dictated by winter frost penetration depths.

A curb box 110 is useful to provide access to the buried valve V. In use (FIG. 4B), curb box 110 is installed in the trench T with the housing 116 of the curb box placed over the valve V with the archways 126 installed over any conduits C extending out sideways from the valve V. This installation positions the stem 112 of the curb box to extend substantially vertically upwardly above the housing. The stem is substantially straight, with laterally resilient joint, herein numbered 130 but according to one of the embodiments described above, in a normal position holding the upper member 112b of the stem substantially in axial alignment with the lower member 112a of the stem.

Figure 4D:
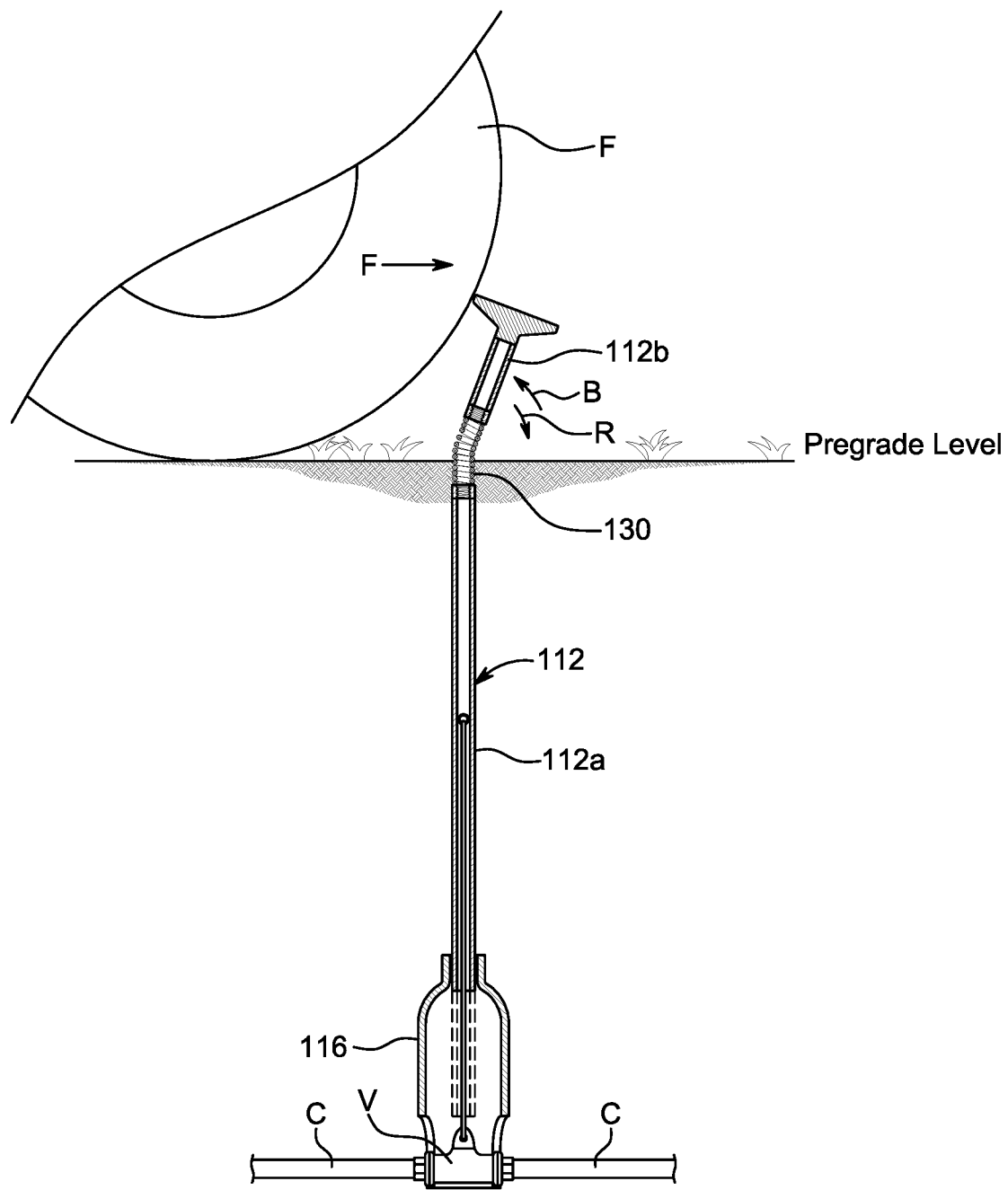
Figure 4E:
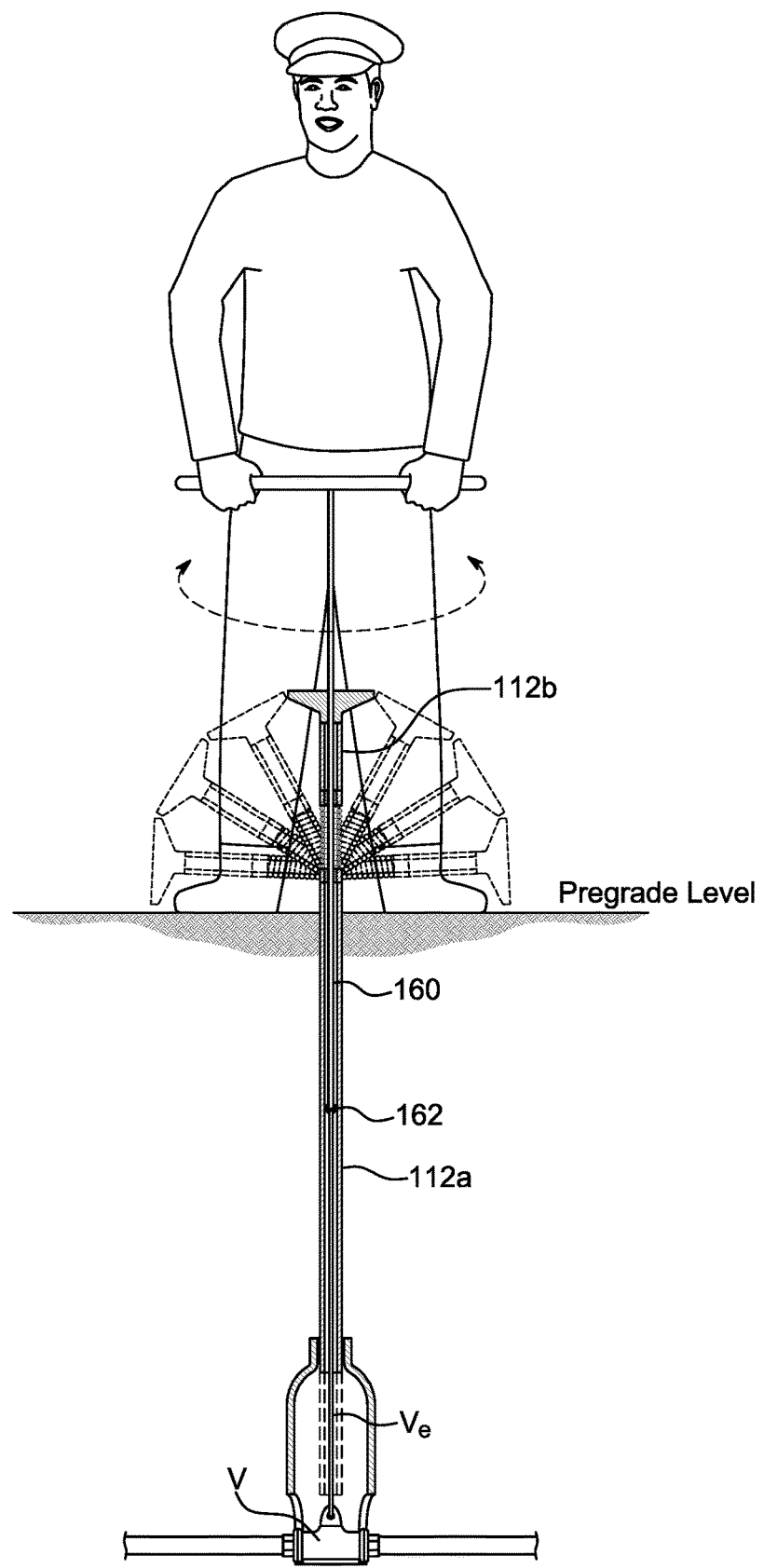

In this embodiment, valve V has an extension Ve through which the valve is actuated (FIG. 4E). The extension Ve extends from within housing 116 up the internal passageway into stem 112.

The trench is then filled as shown in FIG. 4C, commonly called back filled, so that the ground is at a pre-grade level. Pre-grade level may not be the final ground surface level after construction is complete. Instead, pre-grade level is the level of the fill on the construction site during construction.

Back filling buries the conduits C, housing 116 and the valve therewithin and the lower portion of the stem 112. A portion of the stem remains protruding above pre-grade level. Because this portion is exposed above grade level, it is susceptible to impact by construction traffic. The curb box is therefore useful by exposing a laterally resilient portion such as for example joint 130 above the grade level. Joint 130 is positioned with its lower end substantially level with or buried below pre-grade level and upper end of joint 130, where it connects to upper member 112b elevated above grade level. In the embodiment of FIG. 2, for example, lower coupling 134a can be substantially level with or buried below pre-grade level and at least a portion of spring 132 protrudes above pre-grade level. In one embodiment, during, back filling, lower member 112a is completely buried. If an undesirable amount of lower member 112a is or becomes exposed above pre-grade, back filling may be continued to bury, or further fill may be added to rebury, the lower member. Alternately, the length L2 of lower member 112a may be selected, for example, length-selected or adjusted, to seek to have no part of the lower member exposed above pre-grade level. For example, based on an expected depth of fill to be added to bury the curb box housing and lower member of the stem, the length L2 of the lower member can be selected. Alternately, adjustment of length L2 may be done before or after back filling such as by adjusting depth D at the telescopic joint 140, cutting the length L2 of lower end 112a and reconnecting joint 130, etc.

Figure 4F:
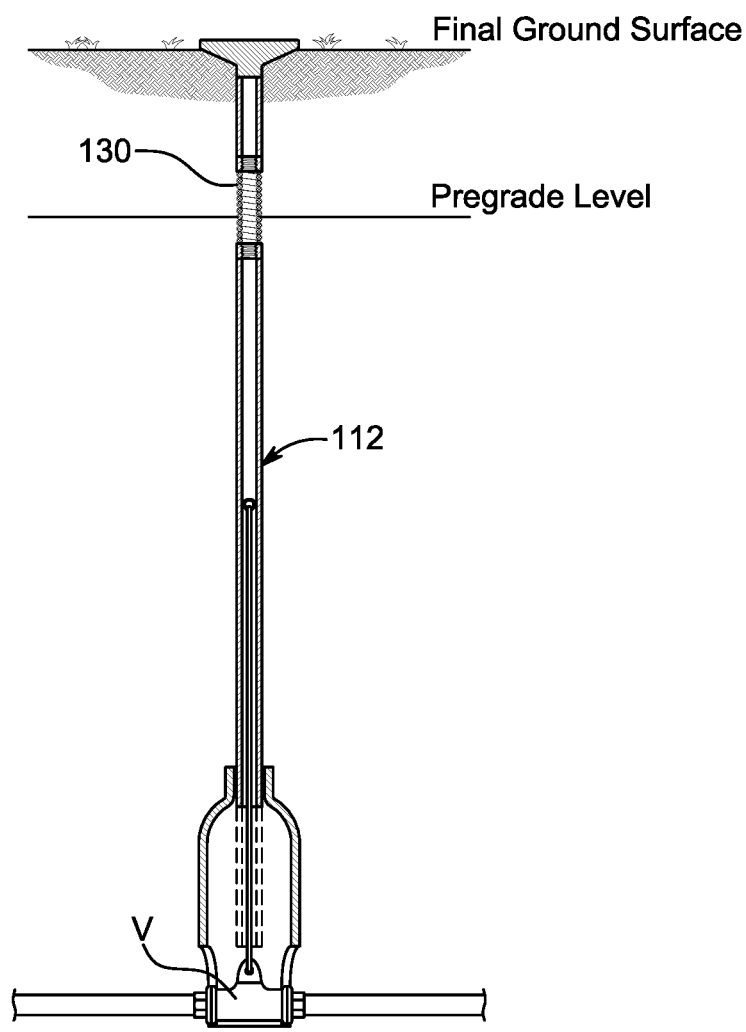

When desired, final grading can add a final amount of soil onto the pre-grade level to raise the ground surface up closer to upper opening 112c and cap 114 (FIG. 4E), the resulting level being called final grade level or ground surface (FIG. 4F). Joint 130 is buried below ground surface after final grading.

Until the final amount of soil is added, joint 130 and upper end 112b remain protruding above grade level. During the construction period, joint 130 allows the curb box to remain undamaged and function even after severe lateral applications of force, arrow F (FIG. 4D), such as being run over by a construction vehicle F. The force causes the joint and the upper member above grade level to flex laterally, arrow R, to one of the positioned shown in phantom in FIG. 4E. Once the cause of the deformation, arrow F, has been removed the joint returns, arrow B, to its original position shown in solid lines in FIG. 4E. The lateral resiliency of joint 130 prevents irreversible damage to the otherwise rigid, straight tubular member defining stem 112, extending from above the grade level to a curb box housing protecting valve V buried at a distance below the surface of the ground. Joint 130, after being bent sideways by force F, is self-righting and resiliently returns, arrow B, to a substantially vertical position with upper member 112b above grade substantially in axial alignment with lower member 112a below grade (FIG. 4E). Thereby, at any time before or after the application of force, stem remains substantially straight and internal passageway remains open such that valve V, Ve can be readily accessed. At any time, therefore, during before or after joint 130 is bent and resiliently recovers to a straight condition, the method can include inserting a tool such as a key 162 attached to the bottom of a rigid, straight rod 160, as shown in FIG. 4E, and manipulating the valve as by rotation. The rod 160 passes through both the flexible joint and the rigid members 112a, 112b of the stem.

For any of various reasons, stem length adjustment, repair, etc., upper end 112b can be removed from joint 130, such as by unthreading at connection 134b and threading in another upper end 112b. Stem length adjustment can also be conducted by telescoping the stem at joint 140 to adjust D, adding an extension to upper end 112b or, in extreme situations, cutting off a portion of the stem.

Thus, the curb boxes in accordance with the invention, which incorporate a self-righting, flexible cylindrical joint into the rigid, inflexible, straight, elongate tubular member, commonly known as the stem. The laterally resilient joint is positioned at grade level, with at least a portion above ground and connected to the rigid lower portion of the stem either at or below grade level so as to prevent accidental damage to the stem where it protrudes above grade level. This curb box thereby preserves the ability to manually open or close a below-ground valve located in the customary manner within the below-ground end of the curb box.

With the curb box according to the present invention, it is possible to manually access the valve even if the stem above ground is at some point deformed, as the stem is configured to resiliently recover and to maintain a substantially straight internal passage way.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A method for accessing a buried valve, the method comprising: installing a housing of a curb box about the valve and with a stem of the curb box extending vertically upwardly from the housing, the stem including a lower tubular member, an upper tubular member and a joint connecting the lower tubular member to the upper tubular member and wherein the joint is laterally, resiliently bendable; adding fill about the curb box to bury the housing and the lower tubular member of the stem, while leaving the joint at least partially protruding above a pre-grade level of the fill; leaving the laterally resilient portion in a vertical protruding position above the pre-grade level, the laterally resilient portion being configured to withstand lateral applications of force with the ability to resiliently recover to the vertical protruding position; and accessing the valve within the curb box by inserting a straight tool through a passageway within the stem, which is open and straight.

2. The method of claim 1 further comprising adding further fill to ensure that the stem is buried up to at least the lower end of the joint.

3. The method of claim 1 further comprising selecting a length of the lower tubular member of the stem to be less than a depth of fill to be added during adding fill.

4. The method of claim 1 further comprising adjusting the length of the lower tubular member to position a lower end of the joint at or below the pre-grade level.

5. The method of claim 1 further comprising adding further fill to the pre-grade level to bring the fill to a final grade and thereby burying the joint.

6. The method of claim 1 wherein accessing the valve occurs after the joint has received a lateral application of force and has bent over and resiliently recovered to the vertical protruding position.

7. The method of claim 1 further comprising telescopically collapsing the stem to reduce the length of the stem above the housing.

8. A method for accessing a buried valve, the method comprising: configuring a curb box to include a stem extending upwardly from a housing, the stem including a lower tubular member, an upper tubular member and a joint connecting the lower tubular member to the upper tubular member and wherein the joint is laterally, resiliently bendable; during construction, leaving the joint exposed at least partially in an upwardly extending protruding position above a pre-grade level of construction fill, the laterally resilient portion being configured to withstand lateral applications of force with the ability to resiliently recover to the upwardly extending protruding position; and, after construction, accessing a valve within the housing by inserting a straight tool through a passageway provided by the upper tubular member, the joint and the lower tubular member, which is maintained open and straight.

9. A curb box comprising:
a housing with a hollow inner cavity and configured to overlie a valve of a utility service;
a stem coupled to the housing and extending upwardly from the housing, the stem including a lower tubular member coupled to the housing, a joint and an upper tubular member joined end-to-end with the joint connected between the lower tubular member and the upper tubular member, and an open internal passageway extending through the lower tubular member, the joint and the upper tubular member to provide access for a tool to actuate the valve from an opening at an uppermost end of the upper tubular member through to the housing, the joint being laterally, resiliently bendable and the upper tubular member being shorter than the lower tubular member to position the joint closer to the opening than to the housing; and
a curb box cap removeably attached at the opening.

10. The curb box of claim 9 wherein the lower tubular member is rigid.

11. The curb box of claim 9 wherein the joint is uniformly elastically deformable in all lateral directions away from a center axis of the stem.

12. The curb box of claim 9 wherein the lower tubular member and the upper tubular member are each rigid.

13. The curb box of claim 9 wherein the joint is a coil spring.

14. The curb box of claim 13 further comprising a shield extending along the coil spring to block debris from passing through the coil spring into the internal passageway.

15. The curb box of claim 9 further comprising a telescopically collapsible joint along the stem.

16. The curb box of claim 15 wherein the telescopically collapsible joint is positioned between the housing and the stem.

17. The curb box of claim 9 wherein the joint is threadedly connected at a lower end to the lower tubular member and threadedly connected to the upper tubular member.

* * * * *